US005625758A

United States Patent [19]

Schneider et al.

[11] Patent Number: 5,625,758

[45] Date of Patent: Apr. 29, 1997

[54] COMMUNICATION PROCESS AND COMMUNICATION SYSTEM FOR COMPUTER-ASSISTED PRINTING

[75] Inventors: Josef Schneider, Diedorf; Armin Weichmann, Kissing, both of Germany

[73] Assignee: MAN Roland Druckmaschinen AG, Offenbach am Main, Germany

[21] Appl. No.: 292,434

[22] Filed: Aug. 18, 1994

[30] Foreign Application Priority Data

Aug. 20, 1993 [DE] Germany .......................... 43 28 026.9

[51] Int. Cl.$^{6}$ ...................................................... G06F 13/00

[52] U.S. Cl. ............................................ 395/114; 395/101

[58] Field of Search .................................... 395/104, 106, 395/109, 114, 162, 101, 118, 153, 163, 200.01, 800; 382/287; 101/148, 365, 13, 18, 93.08; 358/401, 448, 501

[56] References Cited

U.S. PATENT DOCUMENTS

| | | | |
|---|---|---|---|
| 4,495,582 | 1/1985 | Dessert et al. | 364/469 |
| 5,101,474 | 3/1992 | Schleget et al. | 395/114 |
| 5,377,587 | 1/1995 | Kobler | 101/283 |
| 5,467,436 | 11/1995 | Rodi et al. | 395/114 |

FOREIGN PATENT DOCUMENTS

| | | | |
|---|---|---|---|
| 419811 | 4/1991 | European Pat. Off. | B41F 33/16 |
| 495563 | 7/1992 | European Pat. Off. | H04N 1/40 |

*Primary Examiner*—Joseph Mancuso
*Assistant Examiner*—Gabriel I. Garcia
*Attorney, Agent, or Firm*—Cohen, Pontani, Lieberman, Pavane

[57] ABSTRACT

A communication process and accompanying apparatus for enabling communication between different areas of the printing process, e.g. between the preliminary printing stage and the printing press, in either direction so that data for regulating the printing press can be obtained from data which does not depend on the type of printing press and the data to be printed which are received from the preliminary printing stage can be influenced by the printing press itself. The apparatus has a communication structure formed by a central main data processing station, with which a plurality of printing units of the printing press are interlinked for joint preparation of a job, and a decentralized data processing substation for each area of the printing process which can be connected in turn with the main data processing station. The connection between the substations and the main station is formed by device-independent interfaces which allow data to be transferred in either direction.

12 Claims, 4 Drawing Sheets

COMMUNICATION PROCESS AND COMMUNICATION SYSTEM FOR COMPUTER-ASSISTED PRINTING

BACKGROUND OF THE INVENTION

1. Field of the Invention

The invention is directed to a communication process and a communication system with computer-controlled data transfer for controlling the printing process of a printing press.

2. Description of the Prior Art

The course of development in printing technology continues to move away from separate optimization of mechanical and electronic components and increasingly follows the path of improving cooperation between these two divisions. Formerly, the field of printing press electronics could best be summed up as insular, i.e. the press is provided with printing plates, paper, ink and other consumer materials, but does not access existing electronic information and produces a printed product with practically no direct data communications with the outside world. The role of electronics is confined to that of supporting the mechanical components of the printing press. Thus, efforts to achieve better quality, shorter running times or reduction in spoilage, for example, are made by using a greater number of sensors and more intelligent electronics. However, this generally means increased complexity and accordingly an increase in the overall cost of the press.

In a more recent trend of thought, the preparation of the printed image information (in the form of printing plates) is carried out so as to be optimized with respect to the printing press in a process referred to as the preliminary printing stage. This process naturally relies on the acquisition of data concerned with how to proceed with the information subsequently in the printing press so that the modification of information oriented toward the specific printing press can be controlled in order to achieve good results. Naturally, this requires communication between these process divisions.

As a rule, this exchange of data takes place by way of so-called print-run standards which specify a range within which a printing press changes the image data to be printed when using determined grades of ink and paper (e.g., the print-run standard for offset newspaper printing, offset illustration printing or sheet-fed offset printing on coated paper). The preliminary printing stage and the printing press itself must keep within this range. Exceptions are special in-house standards which establish different, more specific transmission characteristics, particularly in the printing of packaging. However, these specialized characteristics are, of course, only valid within the very restricted sphere of operations of the printing house defining them; there are no all-purpose characteristics or acquisition of data not tied to a particular type.

In order to improve printing quality in the sense of better conformity to the original and consistent printing results, it is good policy to allow a flow of information concerning the product to be printed to the regulating means. At the present time, this information is provided almost exclusively by the printer operating the press or by special sensors such as an electronic plate scanner.

Although the product information is available in the preliminary printing stage and is even, in many respects, on a higher level of quality or accuracy than can be made use of by the printer to control the press, this information is generally lost in the output on the printed image substrate.

But the control of the printing press could work better with the respective product information from the preliminary stage if this information were requested and received by the press.

Ideas have already be put forth in this direction, for example, in DE 35 27 500 C2 which proposes a new process and a device for presetting ink zones in offset printing. As a rule, the ink zones are adjusted based on ink consumption according to the associated printing areas. In a first approximation, the ink consumption is identical to the surface of the printing form covered with ink, i.e. the printing area. This area coverage can be measured on the finished printing plate by means of a so-called plate scanner. However, given the knowledge of the imposition layout, i.e. the diagram or layout for arranging individual pages with respect to a printing form, it is also possible to calculate the area coverage from the data of the preliminary printing stage. Since the calculation is made from the original data, the measurement error of the plate scanner is eliminated and the accuracy of the values for adjusting the ink zone is increased. The calculated data are sent to the printing press electronics for presetting.

However, another problem consists in that the preliminary stage must recognize specific parameters of the type of printing press in question, since even the zones, for example, differ from one type of printing press to another. Moreover, it is impossible to calculate the ink slider setting in a definitive manner because, on the one hand, the lateral friction which differs depending on the setting of the press is not taken into account and, on the other hand, the transfer characteristics for the transfer of area coverage values to ink slider position values are not known in the preliminary stage.

Further, it is advisable to obtain information for the control of the printing press in general from the data available in the preliminary printing stage. In this regard, European Patent Application EP 0 495 563 A2 proposes the use of an integrated computer-controlled system for controlling a plurality of stages of a printing process in which the information to be applied to the printing plate is in digital form (digital preliminary stage), this system generating, for example, presetting data (inking control) for the printing press and reference values for the inking control based on this layout information, in particular so as to achieve a given printing characteristic. That is, an exchange of data is organized proceeding from the preliminary printing stage.

However, the entire process can only relate to a determined printing press so that all of the specific data relating to the printing press must be known in order to prepare the data. This means that the preliminary stage must be specially adapted to each distinct printing press.

SUMMARY OF THE INVENTION

On this basis, the object of the present invention is to provide a communication process and associated apparatus for carrying out the process by which communication between different divisions of the printing process, in particular between the preliminary printing stage and the printing press, is optimized so that areas of the printing process operating independently from the printing press need not be specially adapted when using different printing presses and that the printing press can obtain data for presetting and process control without recognizing the type of independently operating zone.

Pursuant to this object, and others which will become apparent hereafter, one aspect of the present invention resides in a communication process in a communication system with computer-controlled data transmission for controlling the printing process of a printing press. A communication structure is provided for linking together digitally operating areas of the printing process which work independently of the printing press, in particular a preliminary printing stage which makes it possible to provide the entire printing form with images. The printing press also has an electronic control unit. The communication structure interconnects these components so as to allow data to be exchanged between the independently working areas and the printing press so that type-neutral data inquiries in either direction are possible. Dam for regulating the printing press can also be obtained from data from the preliminary printing stage which does not depend on the type of printing press. Additionally, data to be printed which is received from the preliminary printing stage can be influenced by the printing press itself.

In a further embodiment of the inventive process an exchange of device-independent data and data relating to a specific printing press is carried out between a data processing substation of the preliminary printing stage and a main data processing station of the printing press, which entails communication of presetting data, characteristic lines and control fields. An exchange of operating data of the printing press and data relating to a specific job is carried out between the main data processing station, for which a database system is provided, and a data processing substation of a production planning system, which results in communication of operating data and job data.

In the case of the preliminary printing stage, for example, this means that the printing press provides an interface structure for the latter into which the data collected by it can be fed and by means of which the data output of the preliminary printing stage, e.g. on a film or plate, can be controlled on the part of the printing press. Thus, the printing press as a whole behaves like a very complex data record which can run in either direction (preliminary stage-to-printing press, printing press-to-preliminary stage). In the computer-to-press direction, in which the image data are first materialized in the printing press, the complete image information can take the form of a device-independent data record.

However, the communication structure is not restricted to the preliminary printing stage and printing press, but may be applied to different areas of the printing process which can operate independently from the printing press.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
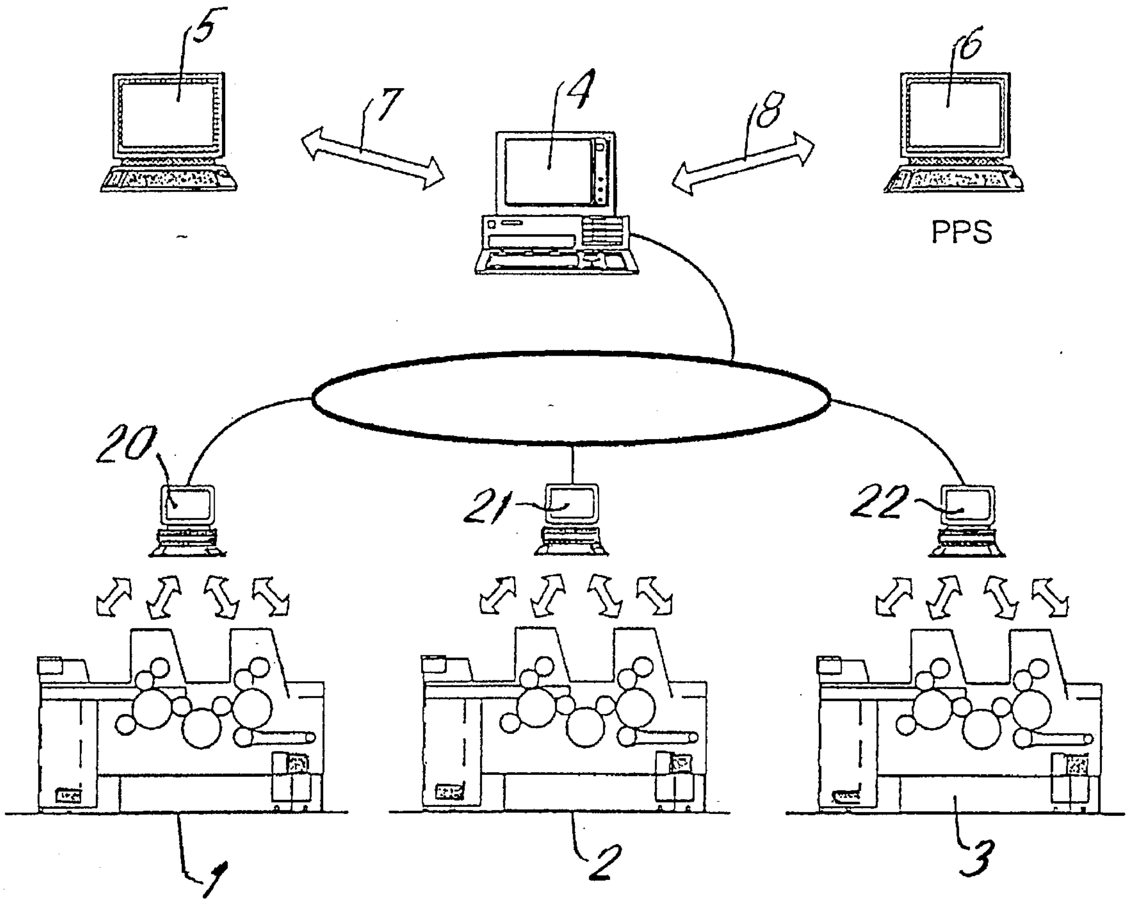
FIG. 1 illustrates a communications structure according to the invention.
Figure 2A:
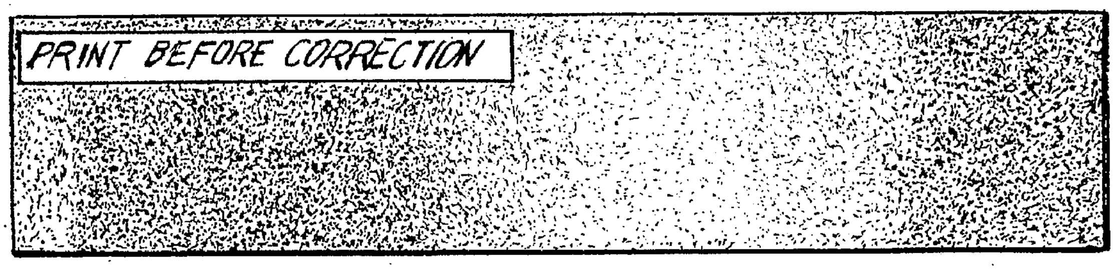
FIG. 2 depicts compensation for ink drop-off in a sheet-fed offset printing mechanism via the cylinder circumference.
Figure 2B:
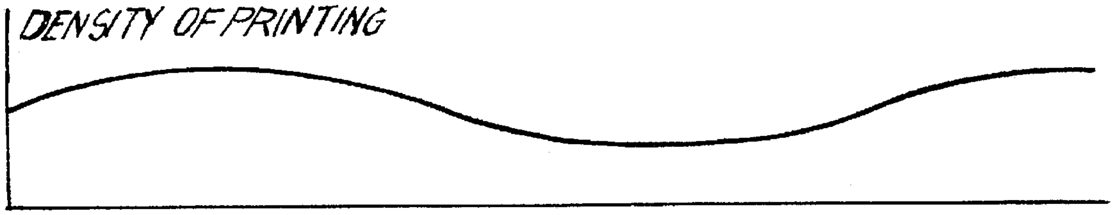
Figure 2C:
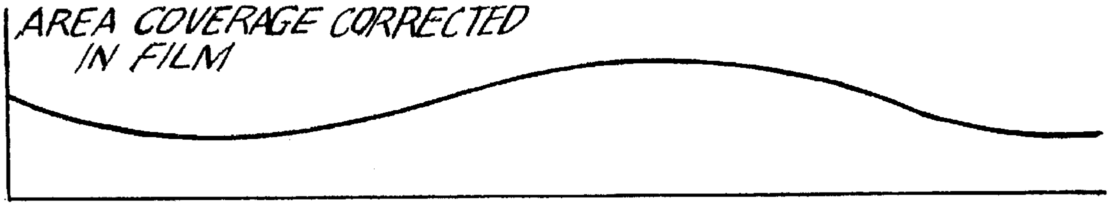
Figure 2D:
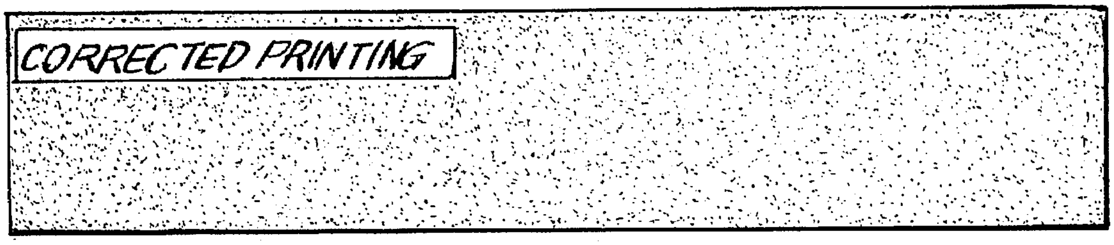

FIG. 1 shows the network configuration of a plurality of printing units 1, 2, 3 with a printing press for the purpose of preparing for a common task by means of a central main data processing station 4. Each printing unit 1, 2, 3 has an electric control unit 20, 21, 22. A decentralized data processing substation 5, 6 for each area of the printing process is connected with this station 4. The connections 7, 8 between the substations 5, 6 and station 4 are formed by device-independent interfaces which allow data to be transferred in either direction. In the present instance, a data processing substation 5 is provided for the preliminary printing stage and a data processing substation 6 is provided for a production planning system (PPS) for preparing job data.

The central station 4 contains the technical job preparation for all printing units 1, 2, 3 connected with it. The technical parameters of the job, such as ink coverage, format or paper thickness, are fed into the central station 4 unless already collected in the preliminary stage (preliminary printing stage, PPS). Further, a database system is set up in station 4 for managing the jobs and device characteristics. The production data or operating data of the individual devices 1, 2, 3, their transfer characteristics and their regulating dynamics are also recorded and randomly processed in station 4.

A PECOM interface available from MAN Roland Druckmaschinen AG is provided for the PPS interface 8. This interface 8 forms the connection between the industry software and the station 4 so that data communications are possible. This leads to a rapid preparation of current data for production from the industry software or of data from production for the industry software. The job data already collected in the preliminary stage can be fed to the machines 1, 2 or 3 via this interface 8 and allocated to the respective job. The PPS in turn can retrieve operating data concerning the individual machines 1, 2 or 3, the current printing status and the status of a job. In this way, the PPS obtains basic data for calculations, production planning or cost calculation.

Another type of exchange of operating data of PPS communication is directed to the optimization of imposition in technical respects relating to the process. When a product is based on a determined imposition layout, the number of colors on a page is predetermined by the production possibilities of the devices or machines, in particular the folding apparatus. Thus, the production possibilities must already be taken into account in the electronicsassisted planning stage of the product. The printing press can send such a production profile to the planning stage or the planning stage can receive verification of the production capabilities of the machine. This can take place interactively with the planning program.

Further, work aimed at optimal production conditions can be carried out already in the product planning stage by means of the information made available in this way. A problem peculiar to offset printing will be discussed for purposes of illustration. Pages arranged one after the other along the circumference can only be regulated by employing a strategy of compromise, since the ink sliders act on a plurality of subjects simultaneously. If the subjects in question have markedly different color acceptance, e.g. one is dominated by blue, the other highly oriented toward red, it is very difficult to achieve satisfactory coloring. Communication of characteristics offers a possibility for circumventing this problem. It may even be possible to ascertain already during the planning stage whether or not such a conflict would arise in the imposition layout. If so, this conflict may be avoided by changing the imposition layout, i.e. by changing the production configuration machinery and rearrangement of pages conditioned by the latter or by altering the product with this objective in mind. At worst, when these changes are impossible, the printer is at least alerted to this critical combination of subjects so that he can pay particularly close attention to it.

Thus, technical preparation for jobs includes adjustments for paper thickness, machine interconnections, turn-over devices, finishing devices or powdering devices, ink registers, edge or cut registers and folding registers or ink zone sliders. The PPS inquires the paper type and the paper thickness can then be calculated and adjusted on the basis of the paper to be used. Cutting and folding registers and the required machine configuration for the pending job are derived from the imposition layout which is likewise inquired by the PPS.

Two formats appear particularly suitable for the interface 7 which exchanges data with the preliminary printing stage. One of these formats is a subset of SGML, the other is a structure relying on TIF format. SGML (Standard General Markup Language) is used particularly in the field of electronic data exchange between computers of different manufacturers for business processes and in the field of technical manuals for purely electronic documentation. TIF (Tagged Image File Format) is a general format for the exchange of graphics data which is indigenous to the field of desktop publishing but which in the meantime has also been adopted in professional image processing. A feature common to both formats is that information can be exchanged relatively freely via the definition of marks or tags. The TIF format is given preference in the described embodiment.

For example, to generate the presetting data, the pages are compiled in the preliminary printing stage and the images and text segments are put in place. Along with the information concerning the placement of pages on the printing plate or printing cylinder, a rough grid of the plate is generated, e.g. in squares of 2.5 mm by 2.5 mm. This rough grid is entered in the exchange file in TIF format as a tag, possibly after processing by TIF-inherent compression methods analogous to a pixel image for reducing the amount of data. The job number, customer's name and other administrative job data are also entered as tags. This information serves as a reference for the job allocation over and beyond the filename. Further, instructions are also added by those responsible for reproduction and creative background or by the client, e.g. the information that, in a certain picture, the product XY to be advertised must be reproduced in a particularly faithful rendering or in a specific way. In the simplest case, this information is conveyed to the printer operating the press or, e.g., is included in the weighting of the control fields to establish a strategy for settings.

If the printing process is controlled mechanically, control elements (color measurement fields for adjusting color and various marks for regulating the different registers) are required, as was already mentioned. These elements can be incorporated in the printing expressly for this purpose or certain areas of the subject may be used for this purpose. Information about these control elements is obtained from the preliminary stage. When imposition is effected electronically, the specific measurement elements are so arranged that position and location are known. This information is transmitted to the printing press. In measuring the subject matter, each page is evaluated in the preliminary stage on a list of typical image parts and the type of control element, position coordinates and dimensions and tolerances to be measured are sent to the press. Examples of suitable measurement fields include locations with negative type for regulating the register and, in offset printing, half-tone areas in one color or a plurality of colors which are printed one on top of the other and whose hue values on a given minimum surface area remain within predetermined tolerances.

Thus, the preferred control element is a search pattern in the form of suitable fields in the subject, and the found fields are conveyed to the printing press as a data record. In this way a pedant is created for the conventional electronic control wedge not belonging to the subject. Thus, the parts which are to be printed critically, for example, can be monitored in particular.

Within the scope of the invention, the printing press 1, 2 or 3 may not only receive control field information, but can also log on if necessary. This means that the preliminary printing stage is informed about the kinds of regulating devices belonging to specific presses 1, 2 or 3 and about which control elements should advisably be placed on the plate. In this way, the fitting out of the printing form with control fields can be adapted automatically.

Figure 4:
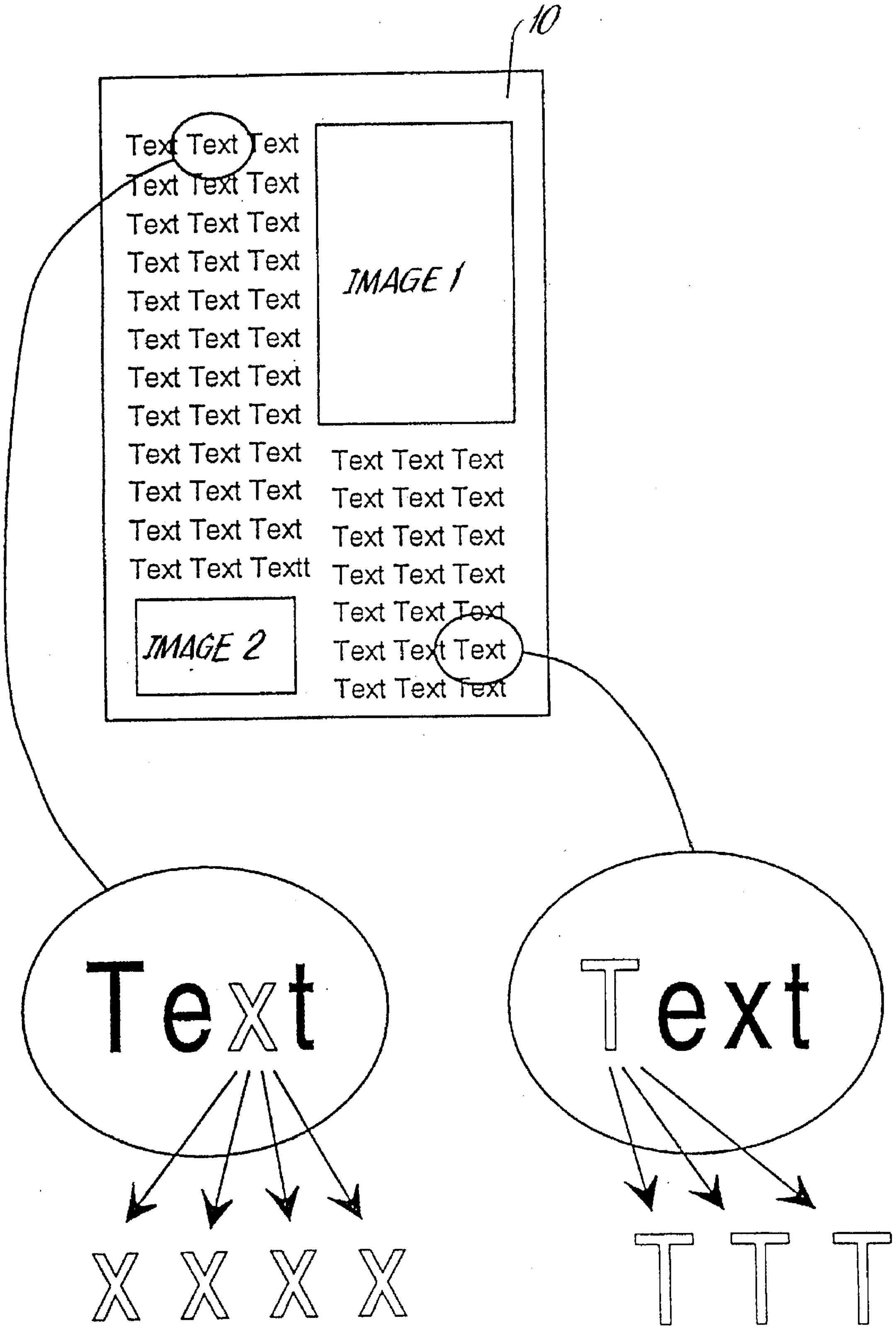
FIG. 4 depicts a type of control element for supervising the exchange of data between the preliminary printing stage and the printing press.

Register marks which are used for adjusting accurately superimposed printing represent a special kind of control field. Normally, crosses or similar geometric marks are placed outside the subject on every color separation for this purpose. The object of the adjustment is then to make these marks coincide or to move them to a specified position. One or more register marks can now be integrated in the subject at a favorable location by means of control field communication. The exact position and geometry is then transmitted to the system in the printing press responsible for measuring and regulating the register. Register marks can be negative text or multi-color edges in an illustrated report or positive text printed in multiple colors. Furthermore, every type of positively printed text (alphabetic characters with printing ink on blank paper) can be transformed into a register mark. For this purpose, text elements selected in the preliminary printing stage are formed from a number of colors instead of from the original color. The various color separations must then be overlaid in the press to regulate the register. When this is done, there will be no noticeable difference compared with the normal text. A subject 10 with two illustrations and black text is taken as an example (FIG. 4). In the upper left-hand corner, the "x" is selected from the word "Text" and is formed in this instance from four color separations: cyan, magenta, yellow and black. In the lower right-hand corner, the "T" is selected from Text and formed from cyan, magenta and yellow. It is particularly advantageous to use especially inconspicuous text elements such as periods, colons, semicolons, hyphens and division marks or the like. Any conceivable combination of color separations can be used for the text elements provided they do not diverge in color too much from the neighboring elements which were printed with the original color. In particular, it is possible to use combinations of register marks combining one or more color separations with a reference color separation (e.g., black with cyan and magenta, black with yellow, black with special colors).

Another possibility for communication with a printing press makes use of elements oriented to image content, i.e. information on the contents of the image is transmitted to the printing press. This can be data which can be derived from the image automatically such as a density histogram, Fourier analysis, dominant color, gray balance, i.e. type of color separation, etc., or may be information concerning the author's intentions regarding reproduction and those elements of the image having the highest priority as well as less important ones.

The description of the author's intentions can be expressed verbally or, for example, in connection with camera settings for a photograph. This description is translated into a fixed structure and included with the image. Examples of such information are:

type of image: portrait, group portrait, landscape quiet/lively image high-contrast/low-contrast image dominant color in image: gray, brown, blue, cyan, green, yellow, red, violet image is more colorful/monotone important elements of image priority of elements emphasis on fidelity of color, brilliance of color or image structure.

Additional information may be stored in memory in tag structure. A number of tags are predetermined or predefined. The tags can contain information, if available, from the author of the image or from the camera which took the picture.

These data can now be used by the printer or by self-learning systems in the press for regulating the press. For example, if the composition of color separations is known, the color space can be converted from RGB to CMYK or an improved strategy can be worked out for regulating black printing ink. This additional information allows every printing process to use its strengths so that the important elements of the image are reproduced particularly well, while tolerating weak points of the reproduction in the less important areas without betraying the intentions of the author. Thus, if desired, a "best effort" strategy can be employed instead of a "no surprise" strategy.

A special category of machines for computer-assisted printing is formed by printing presses which produce the printing form in the press (computer to press) or which produce a new printing form for each print copy (computer to paper) as effected, for example, in laser printers. These machines require complete image data information in order to produce the printing form. In this case, the suggested structure is as follows:

the data are divided into 1. information describing the surface elements, i.e. pixel data, of which each electronically stored image is composed,
2. additional information for reproduction as perceived by the naked eye, i.e. data for color management, and
3. information relating to the image contents as described above, i.e. the generic structure of an image, essential elements of the image, particularly the artistic concept of the author of the image.

In order to process the device-independent data of the preliminary printing stage in a sensible manner, the characteristic lines of the output device must be known to the electronic preliminary printing stage. Thus, a procedure for exchanging the data required for this purpose must be installed and the preliminary printing stage system which calculates the final page run must be capable of processing this data.

The printing press itself can ascertain its status in the form of operating data via mechanisms for self-diagnosis involving installed and external sensors, e.g. color measuring and density measuring devices. This status must then be assigned to a certain operating state, e.g. paper category, color category, rubber blanket category or operating temperature category. The current transfer characteristic lines can be determined for this state. Normally, the transfer characteristic lines are first processed by methods of statistical evaluation, averaging and status diagnosis of machine status before being passed on. For a new job or to modify an existing job, the transfer characteristics can be retrieved from the preliminary stage, incorporated in the output and thus customized specifically for the printing press.

When communication is effected automatically and by way of data structures, a press can be optimized to a substantially greater extent than was previously possible. In the past, even when a specific characteristic was used for a machine-paper-ink combination for a specific job, a maximum of one characteristic line per printing mechanism, i.e., per color, was used. However, in the present case a family of characteristics can be used for each printing mechanism and for each color.

Figure 3:
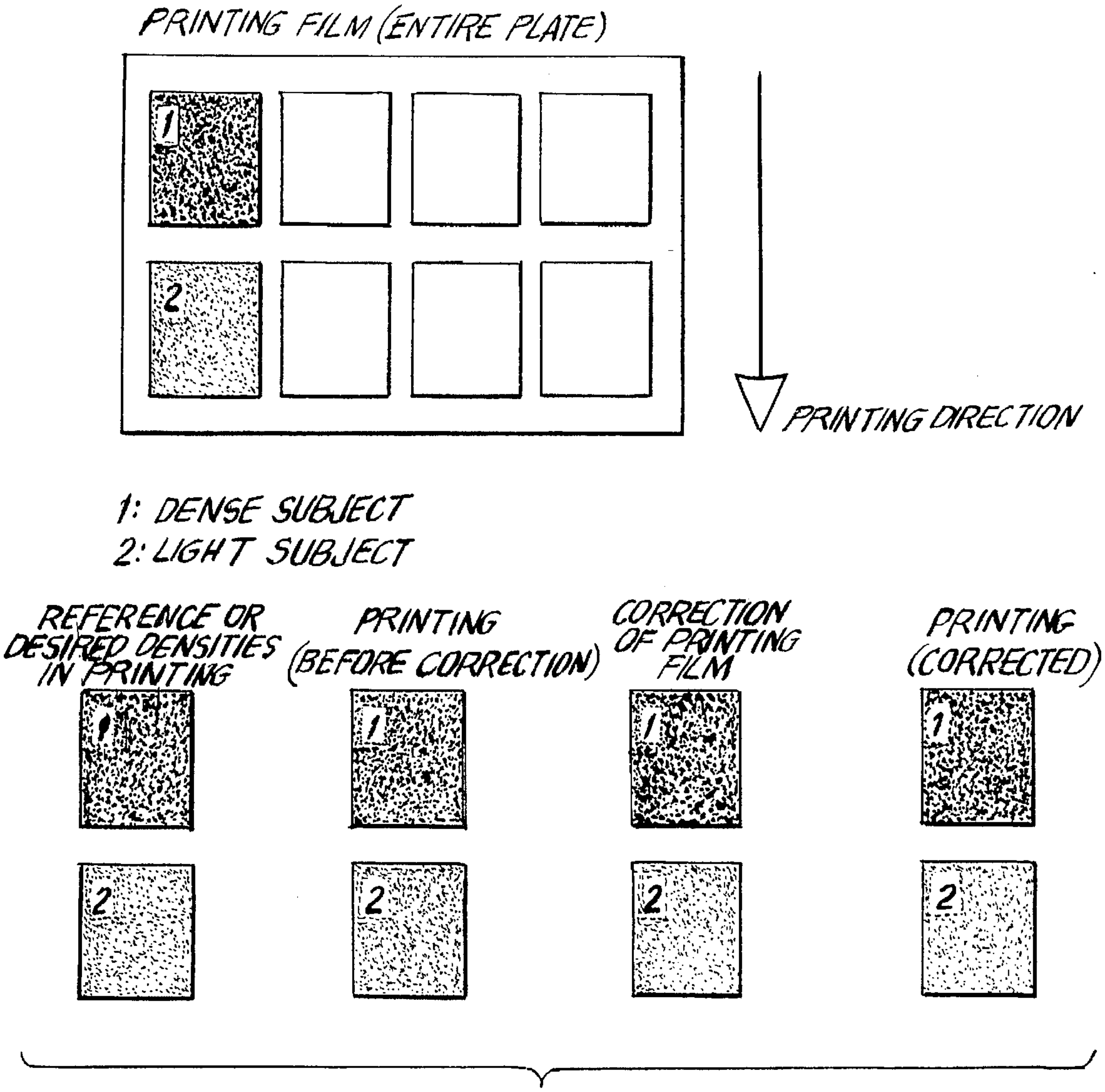
FIG. 3 depicts compensation for stenciling via calculated compensation characteristics.

For example, compensating for the ink drop-off in a sheet-fed offset printing mechanism along the cylinder circumference requires a family of characteristics which continually changes as a function of the distance of the portion of the subject from the start of printing (FIGS. 2*a* to 2*d*). The type of change must be derived from the machine parameters in question. Another family of characteristics which depends on the machine parameters and must also take into account the subject and which can be combined with the first family of characteristics mentioned above relates to compensation for stenciling. Stenciling occurs when there is a large ink drop-off at a location adjoining an area with a low ink drop-off. If these two areas must be serviced by the same ink slider because they lie within the same zone, it is only possible to reach a compromise so that the dark areas are. under-inked and the bright areas are over-inked, leading to a flat printing result (FIG. 3). The preliminary stage can determine the local characteristics requirement for each printing plate together with the subject-inherent stenciling elements to form an overall characteristic line and can output this. In this way, system-conditioned weaknesses of the conventional offset process can be compensated for.

Such characteristic line communication can be used to develop printing presses which require fewer regulating elements and sensors and are accordingly cheaper to manufacture. Provided the requirements for characteristics are known and can be met, a machine which is simplified in this way can produce the same high quality, since fewer regulating processes are necessary.

Within the scope of the present invention, the communication interface can also exist virtually, that is, when the preliminary stage computer and control station computer are different processes on one and the same computer, wherein the processes can communicate with one another via so-called pipes, for example. Accordingly, communication can take place in the form presented herein also between different program parts within a computer.

To sum up briefly, the image data are prepared independently from the device in the preliminary printing stage within the meaning of the invention. The characteristic lines of the printing press are conveyed to the preliminary printing stage by means of electronic data exchange. It is only in the final page run, immediately before output on a material medium, that they are linked with the specific characteristics pertaining to the known output device and printing press. The printing press has ascertained its status via self-diagnosis mechanisms using installed and external sensors, e.g. color measuring devices and density measuring devices. Accordingly, the current or actual status can be shown. The current status is not passed on without filtering, but rather is correlated via allocation to paper category, ink category, rubber blanket category and operating temperature category by methods of statistical analysis, averaging and machine status diagnosis. The preliminary printing stage is informed of the status only after this adjustment. In particular, machine characteristics which were completely ignored in the past using the print-run standard are included in this family of transfer characteristics.

The invention is not limited by the embodiments described above which are presented as examples only but can be modified in various ways within the scope of protection defined by the appended patent claims.

We claim:

1. A communication process in a communication system with computer-controlled data transmission for controlling the printing process of a printing press, the printing process including digitally operating zones which work independently of the printing press, one of the operating zones being a preliminary printing stage including a data processing substation, the communication process comprising the steps of:

linking the digitally operating zones of the printing process which work independently from the printing press;

controlling the independently operating zones of the press with electronic control units; and exchanging data between the independently operating zones and the printing press so that type-neutral data inquiries in both directions are possible, the data exchange including exchanging device-independent digital data and data relating to a specific printing press between the data processing substation of the preliminary printing stage and a main data processing station connected to the electric control units of the printing press in the form of a pre-setting and characteristic line data communication in both directions between the preliminary printing stage and the printing press, and exchanging operating data of the printing press and data relating to a specific job in both directions between the main data processing station and a data processing substation of a production planning system (PPS), so that data for regulating the priming press can be obtained from data from the preliminary printing stage which does not depend on the type of printing press, and so that data to be printed received from the preliminary printing stage can be influenced by the printing press itself, the process further including filling the main data processing station with data collected from the preliminary printing stage for presetting the printing press, influencing essential features of the data, depending on characteristic lines, and controlling the data output of the preliminary printing stage with the main data processing station, and delivering the operating data of the printing press from the main data processing station to the PPS and retrieving job data which have been collected in the PPS with the main data processing station for preparing the printing press.

2. A communication process according to claim 1, including preprocessing and compressing the data of the preliminary printing stage in a manner appropriate for the printing press but so as to be independent of the type of press, and calculating ink slider settings from the compressed data with an inclusion of data relating to the printing press.

3. A communication process according to claim 1, including compensating for an ink drop-off in an offset printing mechanism along a circumference of a cylinder by the main data processing station using at least one characteristic line whose values are constantly changing depending on a distance of a portion of the subject from a start of printing, and deriving changes in the values themselves from parameters of the respective printing press.

4. A communication process according to claim 1, including compensating for stenciling which occurs when there is a large ink drop-off in an area adjoining an area with a low ink drop-off and the two areas are serviced by a common ink slider, by transmitting a family of characteristic lines which takes into account parameters of the printing press as well as a subject to be printed to the preliminary printing stage from the main data processing station and by under-inking dark areas and over-inking bright areas.

5. A communication process according to claim 1, including controlling the printing process with control elements and an exchange of data pertaining thereto between the preliminary printing stage and the printing press.

6. A communication process according to claim 5, including mechanically controlling the printing process.

7. A communication process according to claim 5, including using a search pattern formed of suitable fields in a subject to be printed and conveying fields found in the search pattern to the printing press in the form of a data record.

8. A communication process according to claim 7, including integrating register marks in the subject by control field communication.

9. A communication process according to claim 8, including selecting text elements which are selected in the preliminary printing stage and formed from a number of colors as the register marks.

10. A communication process according to claim 1, including exchanging data oriented to image contents between the printing press and the preliminary printing stage for controlling the printing process.

11. A communication process according to claim 10, including communicating information concerning an image originator's intentions regarding reproduction to the printing press via the preliminary printing stage.

12. A communication process according to claim 10, including dividing the data for controlling the printing process into (a) information describing the surface elements, (b) information for reproduction as perceived by the naked eye and (c) information relating to the image contents when applying computer-to-press processes and computer-to-paper processes.

* * * * *